United States Patent [19]

Erlichman et al.

[11] 4,359,149
[45] Nov. 16, 1982

[54] ACCUMULATOR FOR USE WITH MODULAR PRODUCTION LINE UNITS

[75] Inventors: Irving Erlichman, Wayland, Mass.; John W. Lothrop, Windham, N.H.

[73] Assignee: Polaroid Corporation, Cambridge, Mass.

[21] Appl. No.: 175,061

[22] Filed: Aug. 4, 1980

[51] Int. Cl.³ ............................................. B65G 1/00
[52] U.S. Cl. .................................... 198/347; 198/606
[58] Field of Search ............... 198/347, 580, 599, 606, 198/637, 836

[56] References Cited

U.S. PATENT DOCUMENTS

| | | | |
|---|---|---|---|
| 1,516,016 | 11/1924 | Kallenbach | 198/599 |
| 1,915,482 | 6/1933 | Bartles | 198/606 X |
| 1,994,964 | 3/1935 | Schau | 198/606 X |

OTHER PUBLICATIONS

*Manual and Automatic Assembly*, F. Hartman, Schweizer Maschinenmarkt, 1973, No. 4, Goldbach, Switz.

*Assembly Lines*, by R. Reutebuch, Apr. 1972, Sub-Assembly-Components-Fastening.

*Primary Examiner*—Robert B. Reeves
*Assistant Examiner*—Douglas D. Watts
*Attorney, Agent, or Firm*—John S. Vale

[57] ABSTRACT

An accumulator is provided for use with a production line formed by two or more standardized modular production units for receiving product supporting carriers in sequence from one production unit, advancing the carriers along a serpentine path of travel of a given length, and for thereafter advancing the carriers onto the next production unit. The accumulator includes a plurality of side-by-side conveyors and corresponding passive turnaround guide bars responsive to motion imparted to the carriers by next adjacent conveyors moving in opposite directions for deflecting the carriers from one conveyor to the next adjacent conveyor while at the same time effecting the turning of the carriers through approximately 180°.

1 Claim, 12 Drawing Figures

ACCUMULATOR FOR USE WITH MODULAR PRODUCTION LINE UNITS

BACKGROUND OF THE INVENTION

The present invention relates to the field of systems and apparatus for facilitating manual and/or mechanized work operations (e.g., assembly operations) on a work piece or product supported on a carrier and, more specifically, to an accumulator or buffer unit for accumulating a plurality of such carriers at a selected location along a production line, especially of the type formed by two or more modular units disclosed and claimed in commonly-assigned copending application U.S. Ser. No. 175,249 entitled "Modular Production Line Unit and System" filed on even date herewith by Irving Erlichman.

The modular units each include a low cost commercially available work table having a laminated hardwood table top measuring approximately 72"×28"×2.5" with an upwardly facing work surface; at least one work station where any one or more of a variety of work operations may be performed on the product; a self-contained endless conveyor, preferably having a major lower portion thereof recessed below the work surface, being continuously movable along a horizontally extending closed loop path during the performance of work operations for transporting a plurality of carriers in sequence to and away from the work station; and a carrier handling system at each work station for disengaging a carrier from the conveyor, locating and locking it at a fixed work position above the conveyor to facilitate assembly operations and for thereafter reengaging the carrier with the conveyor for transport away from the work station.

Each of the modular units also includes a pair of roller assemblies recessed into opposite ends of the table top, adjacent a front edge thereof, so that their upper roller surfaces are flush with the carrier supporting surface of the conveyor. When the modular units are arranged serially in end-to-end relation, the facing roller assemblies on successive units are in operative alignment and form a low friction path across the interface for facilitating carrier movement from the conveyor on one unit to the conveyor of the next successive unit in the line. Also provided on each units is a guide bar for deflecting a carrier off of the conveyor so that its momentum carries it across the aligned rollers to the next conveyor.

On most production lines it is desirable to provide accumulator or buffer units at selected points along the line for diverting the flow of carriers from the normal path connecting successive work stations. One function of such an accumulator is to temporarily delay the supply of carriers to the next work station so that the operator thereat may take a short scheduled work break or to allow adjustment or repair of assembly equipment thereat.

The modular units disclosed and claimed in the above-noted copending application also preferably include another pair of roller assemblies adjacent a rear edge of the table, and appropriate corresponding guide bars, for facilitating the advancement of carriers from that unit onto one accumulator and/or for facilitating the advancement of a carrier from another preceding accumulator onto the conveyor. In this case the deflector is mounted for movement between a deflecting position for deflecting carriers to the next successive unit or a non-deflecting position allowing the conveyor to advance the carrier toward the rear of the table where the corresponding guide bar deflects it off of the conveyor and it passes over the roller assembly thereat and then onto an accumulator.

While there are many types of accumulators known in the prior art, they tend to be mechanically complex and expensive. Also these accumulators tend to be of the dedicated type that is specifically designed for a particular product and/or a particular dedicated production line. As a result such accumulators may not be able to be used again if the product goes out of production earlier than planned or its design is radically changed thereby incurring an economic loss. Additionally, accumulators known in the prior art generally are not compatible with the particular modular units described above.

Therefore, it is an object of the invention to provide a simply constructed and low cost accumulator to use on a production line.

It is another object to provide such an accumulator that is compatible for use on a production line formed by the modular units of the type described above.

It is yet another object to provide such an accumulator that is specifically configured for use with carriers of the type having a standardized base section that is compatible with the conveyor and work station components of such a modular unit.

Other objects of the invention will, in part, be obvious and will, in part, appear hereinafter.

SUMMARY OF THE INVENTION

The present invention provides a low cost and simply constructed accumulator usable with a production line formed by a plurality of production units for receiving in sequence a plurality of product supporting carriers advanced thereonto from one such production unit, for advancing the carriers along a path of a given length on the accumulator at a given rate and for thereafter effecting advancement of the carriers in sequence onto the next production unit in the line.

In the illustrated preferred embodiment, the accumulator is especially configured to be compatible with a production line formed by two or more standardized modular production units of the type disclosed and claimed in the previously-noted commonly-assigned copending application U.S. Ser. No. 175,249, and is designed for use with product carriers of the type including a generally rectangular standardized base section of given dimensions.

The accumulator includes a table having an upwardly facing top horizontal surface; a plurality of endless conveyors mounted on the table in side-by-side parallel relation for sequentially advancing a plurality of the carriers along a serpentine path of travel in succession from a first to a last conveyor; means for driving the conveyors; and means for guiding carriers along the path of travel on the accumulator.

The conveyors are designated in successive numerical order starting with the first conveyor and are configured so that each of the odd-numbered conveyors are continuously movable in a first direction away from the production line and each of the even-numbered conveyors are continuously movable in a second direction opposite the first direction toward the production line. Each conveyor is movable along its own corresponding closed-loop path having a major portion thereof adjacent the table top surface and along which the conveyor advances the carriers. The major portions of the paths accumulatively defined the serpentine carrier path of travel of a given length.

The conveyor drive means is arranged to simultaneously drive the odd-numbered conveyors in the first direction and the even-numbered conveyors in the second direction at a uniform given rate.

The guide means include structure for defining an entrance gate for guiding the carriers received from one production unit onto the first conveyor and structure for defining an exit gate for guiding the carriers from the last conveyor onto the next production unit. Also included is a set of passive turnaround guide bars, located at opposite ends of the major portions of the conveyors between the entrance and exit gates and responsive to motion imparted to the carriers by next adjacent conveyors, for guiding the carriers so that they are displaced from one conveyor onto the next successive adjacent conveyor. In a preferred embodiment, the passive turnaround guide bars also effects turning of the carriers to approximately 180° in response to such displacement.

The accumulator in the illustrated embodiment is designed to be arranged at right angles to the production line so that it bridges the interface between successive modular production units. When so located, the exit gate on the accumulator is aligned with a set of rollers in the first modular unit across which a carrier is propelled onto the conveyor, and the accumulator exit gate is aligned with a set of rollers on the second modular unit for receiving a carrier from the last conveyor and facilitating its transport onto a conveyor on that modular unit.

The passive turning guide bars include a straight section for deflecting the leading end of a carrier from one conveyor onto the next conveyor, and a rounded section for guiding the carrier through the turn. In a preferred embodiment, the terminal ends of longitudinal guide rails separating adjacent conveyors are used as fulcrums around which the carrier base can pivot during the carrier turning movement.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
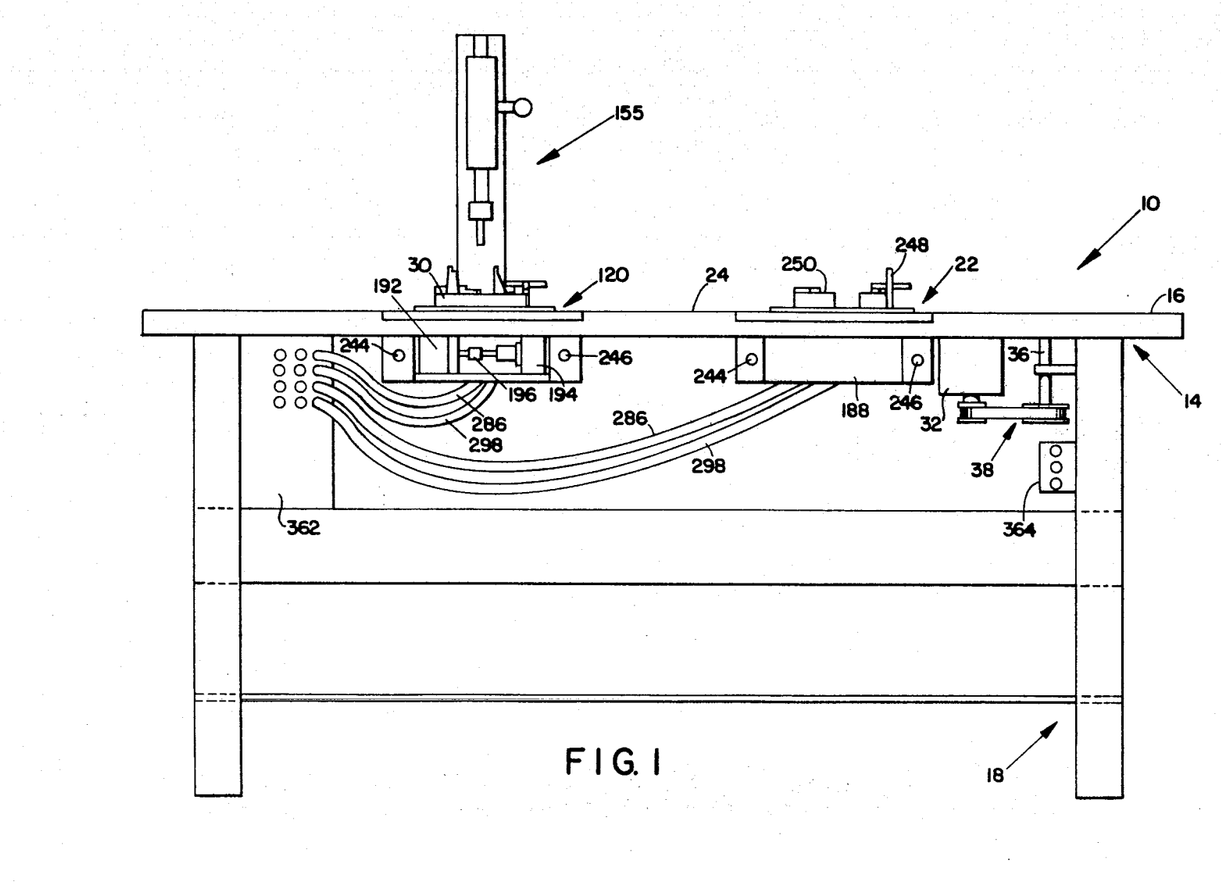
FIG. 1 is a front elevational view of the standardized modular unit.
Figure 2:
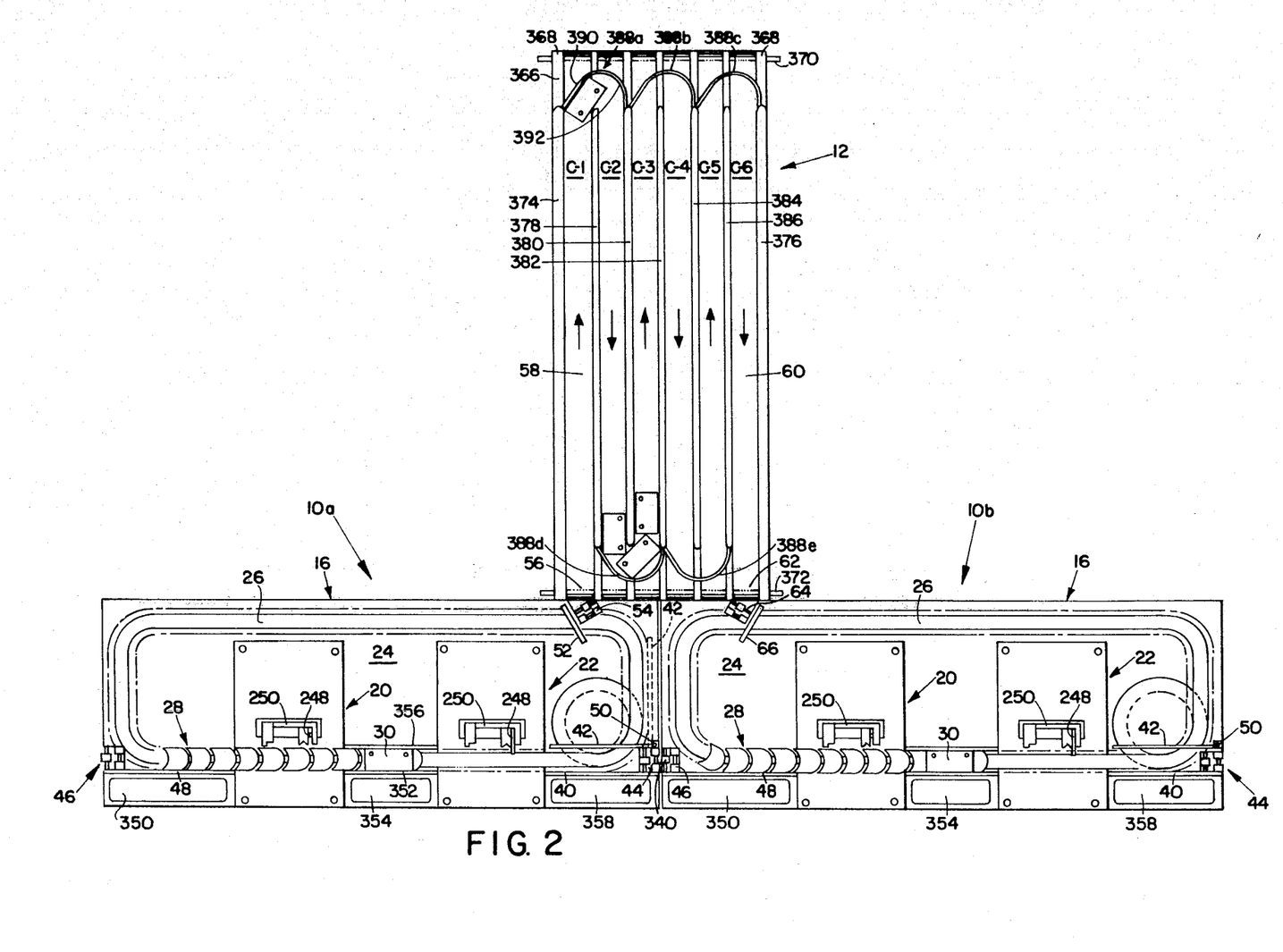
FIG. 2 is a top plan view of a portion of a production line formed by two of said modular units in series and an accumulator embodying the present invention arranged at right angles to these units at the interface therebetween.

FIG. 1 shows a standardized modular unit 10, disclosed and claimed in the previously-noted application U.S. Ser. No. 175,249, for facilitating manual and/or mechanized work operations on a product supported on a carrier. Unit 10 may be used alone as shown in FIG. 1 at different times to effect performance of differing work operations on different products or, alternatively, as shown in FIG. 2, unit 10 is usable in combination with one or more similar units to form an in-line production line wherein the carrier is advanced from a first unit, designated 10a, to at least one successive unit, designated 10b, for the sequential performance of differing work operations on the same product. A production line formed of the standardized modular units 10 may also optionally include one or more accumulator units 12, embodying the present invention and arranged at right angles to units 10a and 10b, which will be described later herein.

Forming an integral part of unit 10 and providing support for its basic components is a low cost, commercially available work table 14 having a wooden table top 16, preferably of laminated hardwood construction, and a base section 18 comprising metal legs interconnected by a plurality of longitudinal stringers for stability. In the illustrated embodiment, the table top 16 measures 72"×28"×2.5". It has been found that these given dimensions provide sufficient work space on the table for two work stations, designated 20 and 22 respectively, located in side-by-side relation along the long dimension of table top 16 adjacent its upwardly facing horizontal work surface 24. As will be described later, work stations 20 and 22 are positions where any one or more of a variety of manual or mechanized (automatic assembly machine) work operations are to be performed.

One such table 14 suitable for use in unit 10 is Work Table Model No. 2719 (top)/2750 (legs) manufactured by Lyon Metal Products.

As shown in FIG. 2, each modular unit 10 has a closed loop recessed channel 26 in table top 16 that extends downwardly thereinto from work surface 24 for receiving a lower major portion of an endless chain conveyor 28 which has its upper or top portion adjacent surface 24 and is substantially continuously movable along a horizontally extending closed loop path defined by channel 26 for sequentially transporting a plurality of product component supporting carriers 30 to and away from the work stations 20 and 22.

As best shown in FIG. 1, conveyor 28 is driven by an electrical motor 32, mounted on the underside of table top 16, coupled to conveyor 28 by a conveyor drive sprocket 34 (see FIG. 4) recessed into table top 16 below work surface 24 and having its depending gear shaft 36 connected to motor 32 by the pulley and drive belt arrangement suggested at 38.

Modular unit 10 also includes means, associated with each of the work stations 20 and 22, for automatically disengaging each of the carriers 30 from the moving conveyor 28 as it enters a work station so that work operations may be performed on the product supported on the disengaged stationary carrier 30, and for thereafter reengaging the disengaged carrier with the moving conveyor 28 to effect its transport away from the work station. Details of this disengaging and reengaging structure will be presented later in this disclosure.

As best shown in FIG. 2, after carrier 30 is transported away from work station 22 it is guided along a longitudinally extending straight line path by guide bars 40 and 42 upstanding from work surface 24 on opposite sides of conveyor 28. Guide bar 42 is spaced above the conveyor 28 and serves to deflect the carrier off of conveyor 28. The momentum imparted to carrier 30 by conveyor 28 propels it across first and second cooperating recessed roller assemblies 44 and 46, aligned at the abutting interface between modular units 10a and 10b so that it is guided onto the conveyor 28 of unit 10b by a longitudinally extending guide bar 48 thereon.

If it is desired to advance the carrier 30 from unit 10a to the accumulator 12 rather than to unit 10b, guide bar 42 is pivoted, about a pivot pin 50 at its end adjacent roller assembly 44, 90° towards accumulator 12 to the accumulating position shown in dotted lines in FIG. 2. As the carrier 30 leaves work station 22 of unit 10a, conveyor 28 carries it around the corner toward accumulator 12 whereupon it is deflected off of conveyor 28 by an angled guide bar 52 which bridges conveyor 28 and guides the carrier 30 across an angled roller assembly 54 into the entrance gate 56 of accumulator 12 where a first conveyor belt 58 transports the carrier in a first direction away from the production line. Successive conveyor belt on accumulator 12 define a serpentine accumulating path of travel of a given length along which a carrier 30 travels until a last conveyor 60 propels the carrier 30 through an exit gate 62 and across an angled recessed set of rollers 64 where an angled guide bar 66 deflects carrier 30 onto conveyor 28 of modular unit 10b. This conveyor 28 then effects advancement of the carrier 30 to work station 20 of unit 10b.

Figure 3:
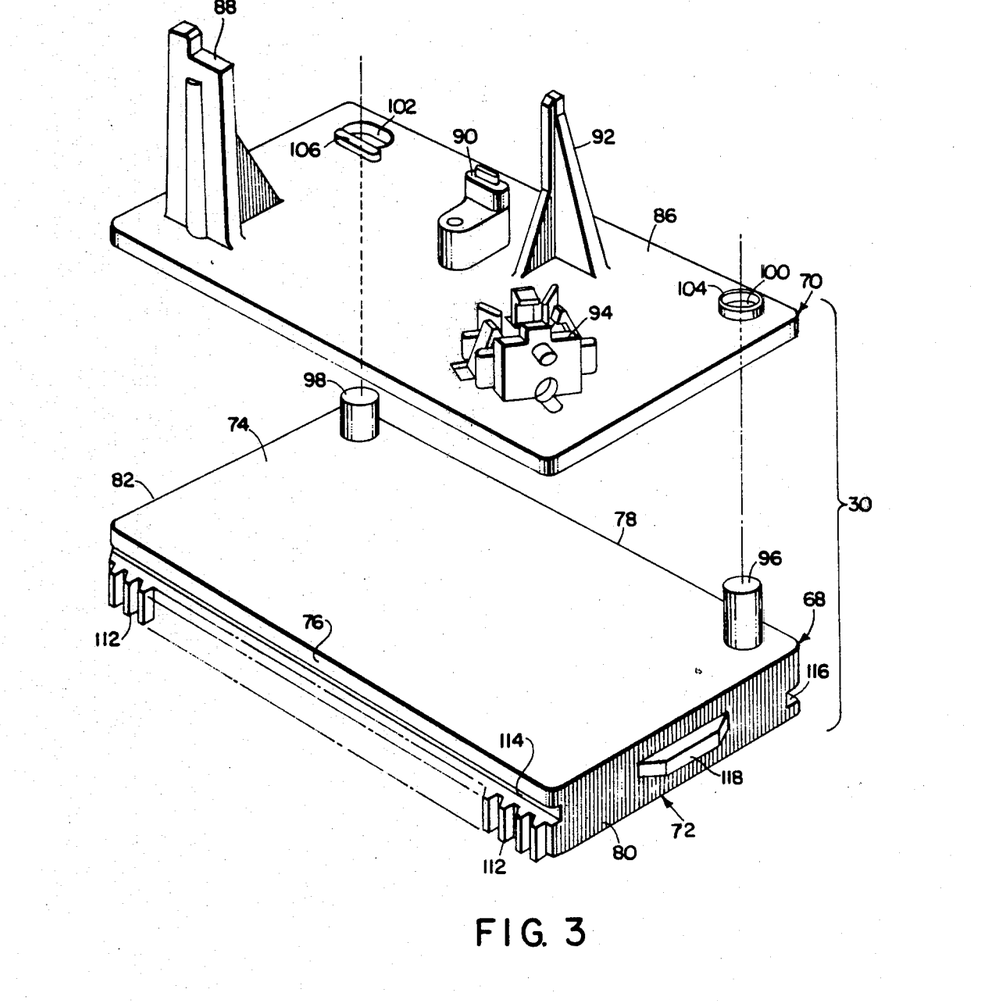
FIG. 3 is a perspective view, shown in exploded fashion, of a carrier embodying the present invention and including a standardized carrier base section and a product supporting nest section.

As most clearly shown in FIG. 3, the carrier 30 includes a standardized reusable carrier base section 68 which interacts with the structure of the modular unit 10 and a disposable nest section 70 that is removably coupled to base section 68 and is specially configured to support and align components of a particular product thereon.

Carrier base section 68 is a block-like parallelepiped-shaped structure, preferably of molded plastic construction, including a planar bottom wall 72 for engaging the top surface of conveyor 28; an oppositely-spaced planar top wall 74 for receiving and supporting a base portion of nest 70 thereon; and a peripheral section including a pair of oppositely laterally spaced and longitudinally extending side walls 76 and 78; a leading end wall 80 and a trailing end wall 82.

Each nest section 70 includes a standardized planar base plate portion 86 that is of the same dimensions as carrier base top wall 74 so as to be seated squarely thereon; and a plurality of integrally molded upstanding component support members 88, 90, 92, and 94.

Carrier base section 68 includes a pair of longitudinally spaced locating pins 96 and 98 adjacent side wall 78 and upstanding above top surface 74. Leading end pin 96 is somewhat taller than trailing end pin 98. The reason for this will become clear later.

Nest section 70 includes on its standardized base portion 86 a pair of corresponding pin receiving apertures 100 and 102 through which pins 96 and 98, respectively, extend for accurately aligning nest section 70 on base section 68 and frictionally coupling these two structures together. As will become apparent later, pins 96 and 98 will serve a second function of accurately locating the carrier 30 at a raised work position located within each of the work stations 20 or 22.

In a preferred embodiment, the aperture 100 is surrounded by an upstanding tight fitting friction collar 104 so that there is a tight fit onto pin 96. The trailing end opening 102 may be slightly elongated in a longitudinal direction to provide some relief of tolerances required over the length of the nest base portion 86 and upstanding rib 106 may be molded along one longitudinal edge of opening 102 so that it provides additional lateral friction against pin 98 for increased holding power. This structure allows for some variation in longitudinal tolerances while at the same time very accurately aligning the nest section 70 laterally with respect to the carrier base section 68.

Figure 7:
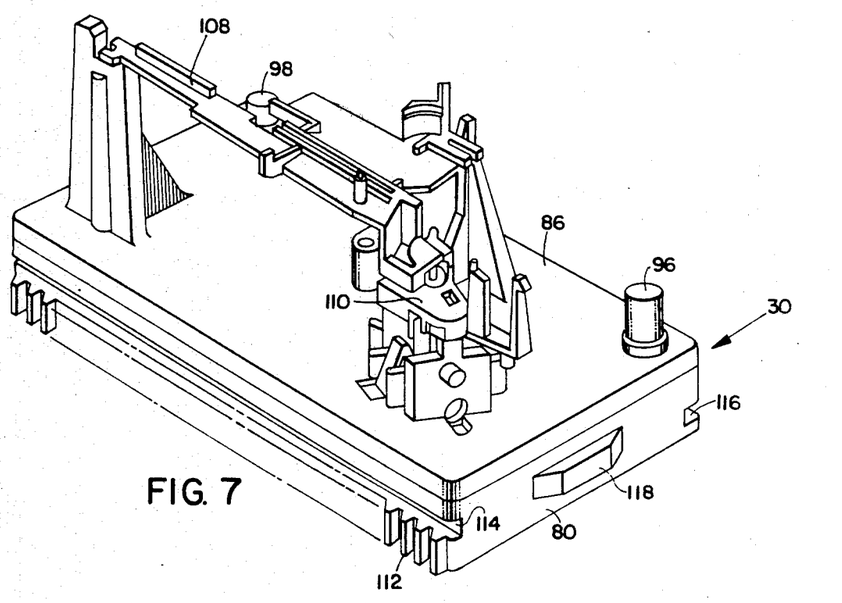
FIG. 7 is a perspective view of the carrier shown in its assembled state and supporting components of a product on its nest section.

The assembled carrier 30 is shown in FIG. 7 with certain components 108 and 110 of a gear train and motor assembly for a self-developing camera shown supported on the component support members on nest section 70.

Returning to FIG. 3, carrier base section 68 includes a longitudinally extending integrally formed tooth gear rack 112 extending along the lower portion of side wall 76; and an integrally formed longitudinally extending ramp structure receiving guide channel 114 thereabove. The opposite side wall 78 includes an integrally formed longitudinally extending ramp receiving guide channel 116 that is vertically offset and lower than channel 114. The functions of gear rack 112 and the channels 114 and 116 will become apparent later.

The leading and trailing end walls 80 and 82 each include thereon an outwardly extending projection having a laterally extending outermost planar surface 118 thereon which will be used to effect self-alignment and spacing of the carriers as they accumulate in abutting end-to-end relation on the moving conveyor 28. That is, the overall length of the carrier base section 68 as measured between the forward and aft surfaces 118 is critical. If it is necessary to adjust the length of base section 68, the projections provide a much smaller surface area that has to be machined as opposed to machining the entire length of either the leading or trailing end walls 80 or 82.

In the illustrated embodiment, the reusable carrier base section 68 measures approximately 6.5"×3"×0.75". The coupling and alignment or positioning pins 96 and 98 are 0.5" in diameter and stand approximately 0.75" and 0.5", respectively, above the top surface of nest portion base plate 86 when the nest section is located in its operative position on carrier base section 68. As noted earlier, nest section 70 is intended to be changed for each particular product. However, each such nest section 70 would always include the standardized base plate portion 86 with apertures 100 and 102 thereon but would include different component support members thereon that are specifically designed for a particular product.

The conveyor 28 preferably comprises an endless conveyor chain having interconnected link assemblies that are substantially of molded plastic construction in a preferred embodiment.

Figure 4:
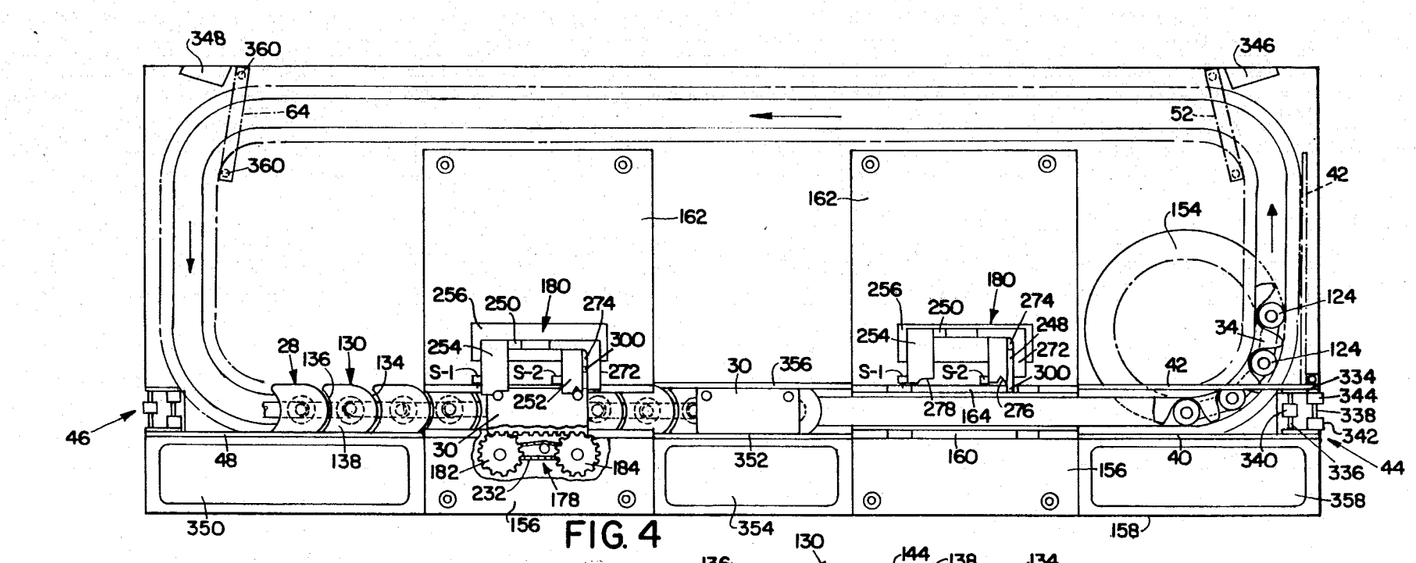
FIG. 4 is an enlarged top plan view of one of the modular units shown in FIG. 2 with certain portions thereof cut away to show the details of selected structure.
Figure 5:
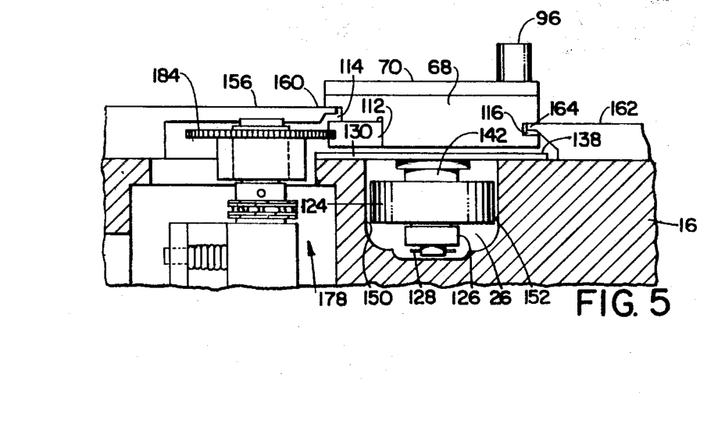
FIG. 5 is a lateral cross-section of a portion of one of the work stations on a modular unit.
Figure 12:
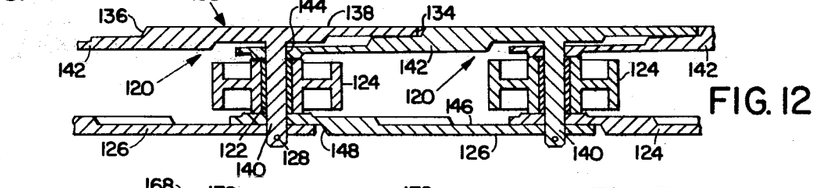
FIG. 12 is a longitudinal cross-section of a portion of the conveyor chain.

As best shown in FIGS. 4, 5 and 12, each link assembly includes an upper link 120; a sleeve bearing 122; a wheel or roller 124; a lower link 126 and a retaining pin 128.

The upper link 120 is a molded plastic piece part having integrally formed therewith a wide horizontal forward flight section 130 including a convex rounded leading end 134, a concave rounded trailing end 136 and an upper planar horizontal support surface 138; a centrally disposed depending roller mounting post 140 having an integrally molded hole at its lower end for receiving pin 128; and a trailing end link portion or tang 142 extending rearwardly from the trailing end 136 of flight section 130 and having an integrally formed opening 144 therein for receiving the post 140 of the next successive upper link 120 in the chain. It will be noted that tang 142 is downwardly offset from flight upper surface 138 so that when the forward end of the flight section of the next succeeding link is positioned thereover, its upper surface 138 is in the same horizontal plane as the surface 138 of the preceding link.

Assembled in order on post 140, starting at the upper end, is the tang 142 of the preceding link; the sleeve bearing 122 which may be either of metal or plastic construction; the roller wheel 124 which has an open central bore that fits over sleeve bearing 122; the lower link 126 from the preceding link assembly; and the lower link 126 which is coupled to the post 140 of the next successive link assembly; and lastly, retaining pin 128 which retains all of these components on mounting post 140. As best shown in FIG. 12, the lower links 126 are of molded plastic construction and have suitable leading and trailing end offset sections 146 and 148 to provide the necessary clearance for proper aligned assembly. Sections 146 and 148 also have integrally molded openings therein for receiving post 140.

As best shown in FIG. 5, the flight section 130 of each link assembly bridges the recess 26 in table top 16 so that lateral edge portions on the underside of flight section 130 engage and ride along the wooden work surface 24 thereby locating the top surface 138 of flight section 130 in closely adjacent relation to work surface 24. The major lower portion of each link assembly extends down into the channel 26 so that it is recessed below work surface 24. The opposite lateral side walls 150 and 152 of channel 26 are engaged by the peripheral surface of the horizontal roller 124 on post 140 so that these surfaces serve as a lateral guide for conveyor 28. The rolling action of rollers 124 provide a low friction coupling to the recessed guide channel 26 to facilitate conveyor movement. Because the conveyor chain is of plastic construction, it is light in weight and therefore the sliding friction between the lateral edge portions of the plastic flight sections 130 and the portions of work surface 24 bordering channel 26 is minimal thereby minimizing wear.

As best shown in FIG. 4, the gear teeth of conveyor drive sprocket 34 extend in between and engage the rollers 124 to provide the driving connection to conveyor 28. Sprocket 34 is seated in a large circular recess which is milled into the table top 16. This recess is later covered by a plastic cover plate 154.

By providing a milled channel 26 and recess for the gear 34 in table top 16, significant cost savings are realized because this structure provides a support system for both the conveyor chain 28 and the gear 34 which does not require any auxiliary support components or structure that would have to be attached to the table top 16. Also, because the conveyor chain 28 is simply laid into channel 26 without any additionally required retaining structure, it may be easily removed from the table if repair is necessary.

The work stations 20 and 22 will be described with reference to FIGS. 1, 4, 5, 6, 8, 9 and 10.

The two work stations 20 and 22 provide on each modular unit 10 are identical. However, in the interests of visual and descriptive clarity, station 20 is shown in FIG. 4 partially cut away with a carrier 30 (having next section 70 removed from carrier base section 68) supported at a fixed raised work position above conveyor 28; and station 22 is illustrated without carrier 30 at the work position to show details of work station structure that are obscured when a carrier is at the work position. Corresponding parts of both stations 20 and 22 will carry the same numerical designation.

The work stations 20 and 22 as shown in FIG. 4 are standardized elements of the modular unit 10 and include all the necessary structure for disengaging the carrier 30 from conveyor 28 for the performance of manual work operations from an off-table position (i.e., an operator's chair on the floor facing the work station) and for thereafter reengaging the carrier with the conveyor to effect its transport away from the work station. As will become apparent later, each work station includes a mounting plate for supporting any type of suitable automatic or semi-automatic assembly machine, as suggested diagrammatically at 155 at station 20 in FIG. 1, for the performance of mechanized work operations from an on-table position within the bounds of the conveyor loop on the opposite side of the work station.

As best shown in FIG. 4 at station 22, each work station includes a generally rectangular elongated cover plate assembly 156 extending laterally from longitudinal edge 158 of table top 16 to the near edge of conveyor chain 28 so that a first ramp member 160 thereon is positioned over the near side lateral margin portion of chain flight sections 130. Mounted on table top 16 opposite cover plate assembly 156 is a large rectangular mounting plate 162 for supporting an automatic assembly machine thereon and including along its front edge a second ramp member 164 positioned over the far side lateral margin portions of flights 130 in facing relation to ramp member 160. The ramp members 160 and 164 are offset vertically (as shown in FIG. 5) so that they are received in the channels 114 and 116 respectively in carrier base section 68 as the carrier 30 is advanced into the work station by conveyor chain 28. Thus the laterally spaced ramp members 160 and 164 define ramp structure associated with each work station for defining a carrier guideway through the work station over the conveyor path.

Figure 6:
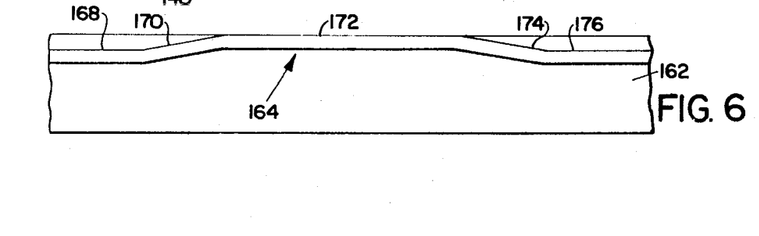
FIG. 6 is an elevational view of one of the carrier ramp structures located at the work station.

A front elevational view of ramp member 164 is shown in FIG. 6. It includes a horizontal entry section 168 spaced above the top surface of conveyor 28 in parallel relation thereto so that it enters channel 116 on the far side of carrier base section 68. Beyond entry section 168 is an upwardly inclined ramp section 170 that slopes upwardly from conveyor 28 and leads to a horizontal work position section 172 which is higher than the entry section 168. It is on this central portion of the ramp structure where the carrier 30 is supported at a raised work position above the moving conveyor 28 for the performance of manual or mechanized work operations. Beyond section 172 is a downwardly sloping section 174 which leads to a horizontal carrier exit section 176 which locates the carrier base section 68 back in engagement with conveyor 28 to effect carrier transport away from the work station by the conveyor.

Ramp member 160 on the opposite side of the carrier path through the work station includes identical sections 168 through 176, but the entire ramp member 160 is vertically offset and higher than ramp member 164 so that it is automatically received in the higher guide channel 114 on the near side of the carrier base 68. The cross-sectional view of the ramp structure shows that the front ramp member 160 is mounted on, or may be integrally formed with, the rear edge of plate assembly 156 and the oppositely-spaced ramp member 164 is mounted on, or may be integrally formed with, the front edge of mounting plate 162.

With the provision of the described ramp structure at the work station and the corresponding receiving channels on carrier base section 68, it becomes apparent that the carrier 30 can be lifted off of and positioned above the conveyor 28 if, upon entering the work station, some type of carrier drive system, independent from the conveyor 28, is provided for advancing the carrier 30 along a work station path in the same direction and at substantially the same speed as the conveyor 28.

As best shown in FIGS. 4, 5, 8, 9 and 10 each of the work stations 20 and 22 on modular unit 10 includes a self-contained, independently-operable carrier drive assembly 178 for driving a carrier 30 along the ramps 160 and 164 to lift and lower the carrier with respect to conveyor 28; and a carrier locating and locking assembly 180 for accurately locating the carrier 30 at the raised work position and locking it in place in cooperation with elements of the carrier driver assembly 178 so that it is rigidly supported thereat to facilitate the performance of manual or mechanized work operations.

The carrier drive assembly includes a pair of interconnected drive gears 182 and 184 which mesh with the elongated rack 112 on carrier base section 68 so that carrier 30 is driven or advanced linearly (to the right as viewed in FIG. 4) along the ramps 160 and 164 in response to clockwise rotation of gears 182 and 184.

Figure 10:
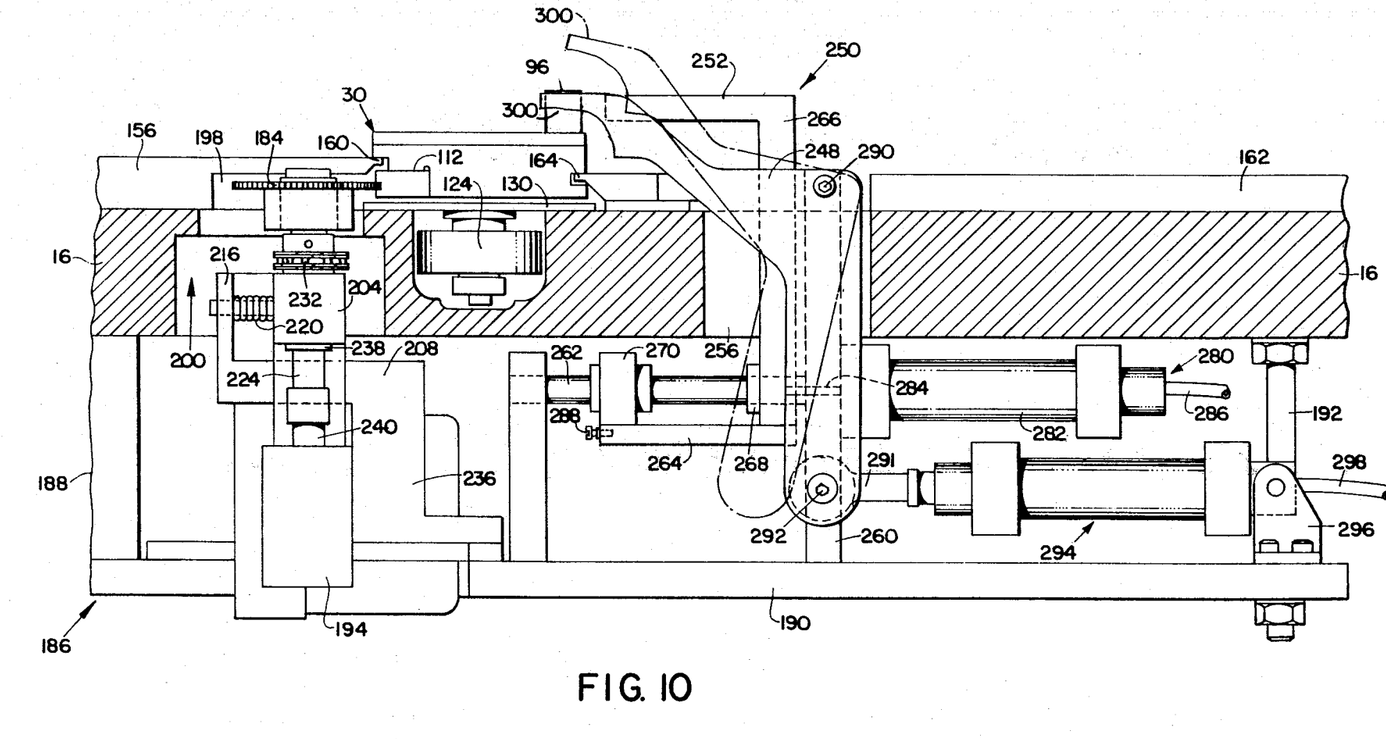
FIG. 10 is a lateral cross-sectional view of a larger section of a work station.

As best shown in FIGS. 1 and 10, assemblies 178 and 180 are supported on an L-shaped bracket 186 secured to the underside of table top 16. Bracket 186 includes a vertical front panel 188 depending from table top 16 adjacent edge 158 and a horizontal base plate 190 secured to the lower edge of panel 188. The trailing end of bracket 186 may be secured to the underside of table top 16 by any suitable means such as the vertical bolt 192 shown in FIG. 10.

In FIG. 1, a front cover plate on panel 188 at work station 20 is removed to show a small electrical gear drive motor 192, secured to base plate 190, that is coupled to a right-angled speed reduction gear box 194 by means of a flexible coupling 196.

The gears 182 and 184 are located in a recess 198 on the underside of cover plate 156 so that their engaging peripheral sections lie under the front ramp 160. Access to recess 198 is provided by an elongated opening 200 in table top 16.

Figure 8:
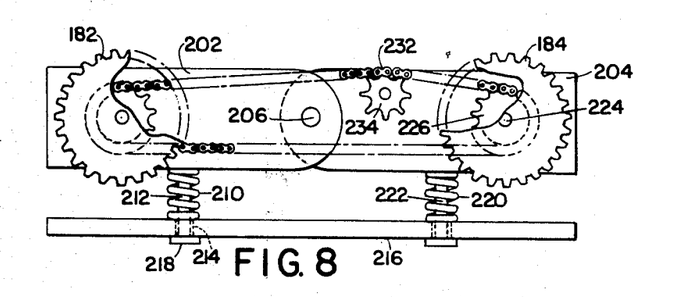
FIG. 8 is a top plan view, partially cut away, of a resiliently mounted drive gear assembly, forming part of a carrier drive system, shown in its unstressed state.
Figure 9:
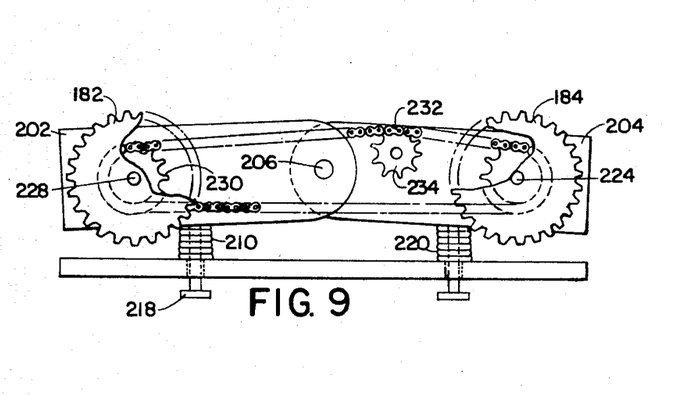
FIG. 9 is similar in some respects to FIG. 8 but shows the gear assembly in its retracted or stressed state.

As best shown in FIGS. 8 and 9, the gears 182 and 184 are preferably resiliently mounted for movement toward and away from the carrier path of travel along a ramp structure. In the illustrated embodiment, the drive gears 182 and 184 are rotatably mounted, respectively, on a pair of articulated longitudinally-extending mounting blocks 202 and 204 having their interfacing ends pivotally connected by a pivot pin 206 secured to a horizontal stanchion member 208. A clockwise biasing force is provided on mounting block 202 by a helical compression spring 210 that is wound about a spring support pin 212 secured at one end to block 202 and passes through an opening 214, in a vertically-extending support plate 216 secured to the forward end of stanchion member 208, where it terminates in a pinhead section 208 that is of larger diameter than hole 214. A counterclockwise biasing force is provided to block member 204 in a like manner by means of a compression spring 220 mounted on spring support pin 222. The terminal end heads of pins 218 and 222 limit the extent of movement of the gear support blocks 202 and 204 to the aligned operative position shown in FIG. 8 wherein the gears 182 and 184 are located closest to the carrier path of travel. When the gears 182 and 184 are in mesh with the carrier rack 112, the gear support blocks 202 and 204 will pivot to the retracted position of FIG. 9 and the springs 210 and 220 will provide the maximum laterally directed biasing force so that gears 182 and 184 will urge the carrier 30 toward the locating and locking or gauge assembly 180.

In the illustrated embodiment, gear 184 is fixedly secured to a shaft 224 that passes through mounting block 204 and has a secondary drive sprocket 226 of smaller diameter secured thereto below gear 184. Likewise gear 182 is fixedly secured to a shaft 228 that passes through mounting block 202 and has a secondary sprocket 230 secured thereto. The secondary sprockets 226 and 230 are interconnected by a drive chain 232 which in a preferred embodiment also engages an idler sprocket 234 mounted on block 204. The idler sprocket 234 is helpful in taking up the slight amount of slack in chain 232 when the mounting blocks 202 and 204 pivot to their retracted position of FIG. 9.

As best shown in FIG. 10, that portion of the carrier drive assembly shown in FIGS. 8 and 9 is mounted on a stanchion 236 secured to base plate 190 of which the previously-described horizontal stanchion member 208 is a part thereof.

The shaft 224 supporting gears 184 and 226 passes through a bushing 238 in mounting block 204 and has its terminal end coupled to the output shaft 240 of the speed reduction gear box 194 by means of a flexible connector 242. Thus, gear box 194 moves with mounting block 204 and this motion is accommodated by the flexible coupling 196 between gear box 194 and motor 192 and connector 242. When motor 192 is energized, it drives shaft 224 so that gears 182 and 226 thereon rotate in a clockwise direction. The second drive gear 182 is driven simultaneously in the same direction by means of the drive chain interconnection between the secondary sprockets 226 and 230.

As best shown in FIG. 1, the manual work station 22 is provided with a pair of operator-controlled motor start buttons 244 and 246 mounted on panel 188. The dual button structure is preferred for safety reasons to insure that the operator's hands are away from the conveyor and carrier drive elements. The illustrated mechanized work station 20 in FIG. 1 will have later-to-be-described micro switches for actuating the carrier drive system at appropriate times.

The carrier locating and locking assembly 180 at each of the work stations includes a stop member 248 pivotally mounted for movement between a lowered operative position (shown in solid lines in FIG. 10) where its forward terminal end 300 is located in the path of travel of the taller locating pin 96 on carrier 30 so as to be engaged by pin 96 to temporarily prevent passage of the carrier 30 beyond the raised work position as the carrier enters the work station, and a retracted or raised inoperative position (shown in dotted lines in FIG. 10) where the forward terminal end is out of the forward path of the pin 96 to allow the carrier 30 to be advanced by the carrier drive assembly 178 down the ramp structure and back onto the conveyor 28; and a carrier or gauge or locating and locking member 250 slidably mounted for movement between a forward operative position (shown at work station 20 in FIG. 4) where pin engaging fingers 252 and 254 engage carrier pins 96 and 98 respectively for accurately locating the carrier 30 at the raised work position and for cooperating with the spring biased gears 182 and 184 for locking the carrier thereat, and a retracted inoperative position (shown at work station 22 in FIG. 4 and in FIG. 10) wherein the fingers 252 and 254 are disengaged from the carrier pins thereby allowing the carrier drive assembly to advance the carrier 30 out of the work station when stop 248 is in its raised position.

The components of locating and locking assembly 180 are mounted on base plate 190 under the table top 16 with portions of stop 248 and member 250 extending up through an elongated rectangular axis opening 256 in plate 162 and table top 16 to position this structure above the table work surface 24.

The supporting structure includes a short vertical mounting plate 258 extending upwardly from base plate 190 under conveyor 28 and an oppositely-spaced longer vertical plate 260 also mounted on plate 190 and extending upwardly through opening 256 near the back edge thereof. Extending laterally between plates 258 and 260 is a pair of horizontal guide rails 262 (only one shown) for slidably receiving member 250.

Member 250 comprises a horizontal base plate 264 and a vertically upstanding back plate 266 secured to the rear edge of plate 264 and extending upwardly therefrom through opening 256. The guide rails 262 pass through a pair of rear journal bearings 268 on plate 266 and a pair of forward journal bearings 270 mounted on the forward end of base plate 264. Mounted on the top end of plate 266 are the forwardly extending fingers 252 and 254 and a guide finger 272 located in spaced parallel relation to finger 252 to define therebetween a linear guide slot 274 for receiving and guiding movement of the upper end of stop 248.

Finger 252 has a V-shaped notch 276 at its forward end for receiving pin 96. The second finger 254 includes a flat edge bearing surface 278 for engaging the peripheral edge of pin 98. A radius is provided at the end of surface 278 to clear pin 98 so that the engagement of this pin with finger 254 is only at the bearing surface 278.

The V-shaped slot 276 captures pin 96 and thereby provides an accurate means for locating the carrier 30 both longitudinally and laterally with respect to the raised work station. Because notch 276 insures longitudinal accuracy, only the flat surface 278 is required on finger 254 to insure the correct lateral disposition of the trailing end of carrier 30 with respect to the raised work station.

In the illustrated embodiment, member 250 is slidably moved between its forward and retracted positions by means of a pneumatically operated reversible piston actuator assembly 280 having its cylinder 282 secured to vertical plate 260 and its piston shaft 284, which extends through an appropriate opening in plate 260, fixedly secured to the vertical plate 266 of member 260. Air pressure is supplied to assembly 280 via an air hose 286 attached to the trailing end of cylinder 282.

The rear surface of vertical plate 258 serves as a position limiting stop for the forward movement of member 250. In the illustrated embodiment, an adjustment screw 288 is provided on the forward end of plate 264 and serves as a laterally adjustable stop for defining the forwardmost position of member 250 when the head of screw 288 engages the back side of vertical plate 258.

The pin stop 248 comprises a generally L-shaped lever having its midsection pivotally coupled to the upper end of vertical plate 260 by means of a pivot pin 290 and having its lower end pivotally connected to the piston coupling 291, at pin 292, of a second reversible pneumatically operated piston actuator assembly 294 that is mounted on a bracket 296 on plate 190 and receives air pressure through a hose 298 coupled to its trailing end.

When the piston of actuator assembly 294 is retracted, stop 248 pivots in a counterclockwise direction about pin 290 to locate its upper terminal end 300 in the path of travel of pin 96 on carrier 30. When the piston is extended, stop 248 pivots in a clockwise direction about pin 290 to raise the terminal end 300 above and out of the path of travel of the pin 96 on carrier 30.

The manner in which the carrier drive assembly 178 and the locating and locking assembly 180 cooperate to manipulate the carrier 30 within a work station will be described with reference to FIGS. 4 and 11.

Figure 11:
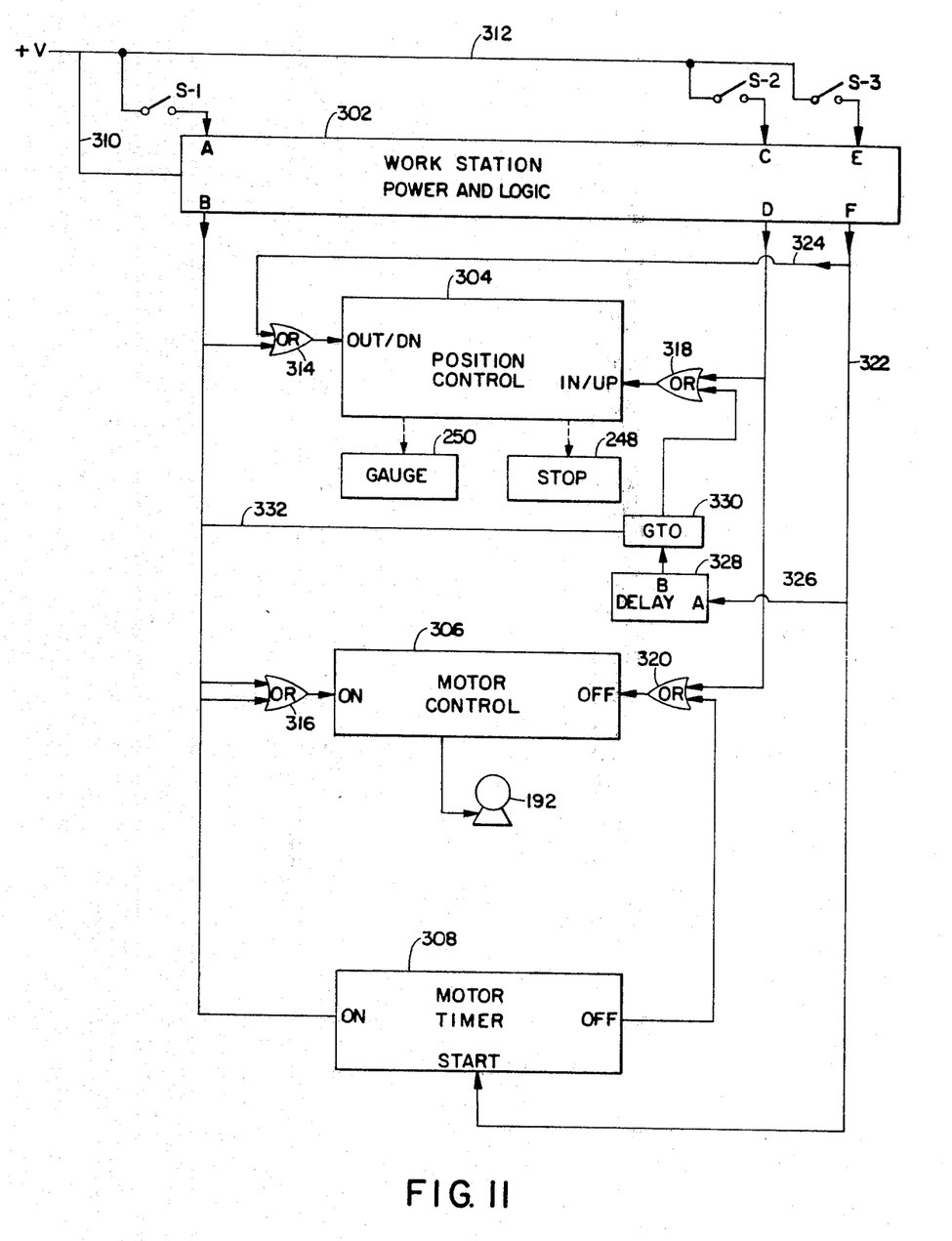
FIG. 11 is a functional block diagram of a work station control system.

FIG. 11 shows a work station control system in functional block diagram form. Major elements of the system include a work station power and logic circuit 302; a position control circuit 304 for controlling the operation of stop member 248 and gauge member 250; a motor control circuit 306 for controlling operation of the carrier drive system motor 192; and a motor timer circuit 208 which upon actuation is operable for operating motor 192 through circuit 306 for a predetermined time interval.

Power and logic circuit 302 is energized over line 310 connected to a positive voltage supply line 312 and provides electrical power to the other circuit along with certain control and sequencing functions. Connected, respectively, between line 312 and input terminals A, C, and E of circuit 302 are three normally open switches S1, S2 and S3.

In the illustrated embodiment, the S1 switch is a micro switch mounted on base plate 162 just before finger 254 of gauge 250 so that the switch contact extends out over ramp member 164 in position to be engaged by the edge of carrier base 68 (see FIG. 4). The S2 switch is also mounted on plate 162 with a major portion thereof under finger 252 so that its contact is in the path of travel of the carrier base section 68 in alignment with V-notch 276 in finger 252. S1 serves as a sensor for detecting the presence of a carrier 30 in position to be engaged by the drive gear 184. The S2 switch serves as a sensor to detect the presence of the carrier 30 at the raised work position wherein its forward pin 96 is engaged with the terminal end 300 of the stop member 248, located in its down position, in position to be engaged by the V-notch section 276 on finger 252. The S3 switch is actuated manually by the operator pressing on the actuator buttons 244 and 246 on panel 188 for initiating that portion of control cycle wherein the carrier 30 is released and then driven down the ramp structure onto conveyor 28.

It will be understood that the microswitches shown in FIG. 4 may be replaced by any other type of sensor, for example a electro-optical device, as long as they are capable of sensing the position of carriers within the work station in providing an electrical output signal to the inputs A and C of circuit 302.

By way of illustration, it will be assumed that there is only a single carrier 30 on a conveyor 28 (in FIG. 4) being advanced toward the entrance side of work station 20. When position control circuit 368 is not energized, gauge member 250 assumes its normal forward locking position and stop member 248 assumes its normal raised or up position.

The conveyor 28 will advance carrier 30 into the work station until the leading edge of forward pin 96 thereon engages the outside edge of finger 254 which serves as a stop to align the gear rack 112 on carrier base 68 with gear 182 for engagement thereby. Although the carrier 30 is stopped at this position, conveyor 28 continues to move and slides along the underside of carrier base section 68.

In response to the carrier 30 moving into this position, the normally open S1 switch is closed providing an input signal to terminal A of circuit 302 that provides an output signal at terminal B which is fed through an OR gate 314 to the out/down input terminal of circuit 304. In response to this signal, circuit 304 operates solenoid actuated valves (not shown) which control the air supply to the pneumatic actuators 280 and 294 associated with gauge member 250 and stop member 248. In response to operation of these valves, gauge member 250 moves to its retracted or out position and stop member 248 pivots from its up position to its down position.

The output signal from terminal B is also fed through an OR gate 316 to the on input terminal of motor control circuit 306 thereby energizing motor 192. Motor 192 rotatably drives gears 182 and 184 to advance the carrier 30 up the ramp structure to the raised work position wherein pin 96 engages the terminal end 300 of stop member 248. At this time, the S2 switch is closed. It should be noted that motor 192 is preferably a low torque, continuous duty shaded pole motor which may be allowed to stall momentarily after the carrier 30 is stopped by stop member 248 without damage to the motor which will be turned off in response to the carrier closing the S2 switch.

When the S2 switch is closed, it provides a control signal to the input terminal C of circuit 302 that then provides an output signal at terminal D which is fed through an OR gate 318 to the in/up input terminal of circuit 304 and also through OR gate 320 to the off terminal of motor control circuit 306 for deenergizing motor 192. Position control circuit 368 responds to this signal to its in/up terminal by effecting advancement of the gauge 250 to its forwardmost locating and locking position (shown in FIG. 4) and thereafter causing stop member 248 to pivot to its raised or up position. It should be noted that position control circuit 304 operates the gauge member 250 at a slightly faster rate than the stop member 248. That is, gauge member 250 engages pins 96 and 98 before the terminal end 300 of stop member 248 is completely disengaged from pin 96. Also it will become disengaged from pins 96 and 98 before stop member 248 is pivoted down to its blocking position. When carrier 30 is at the raised work position, it is located beyond switch S1 which returns to its normally open position when the carrier becomes disengaged therefrom.

At this point the carrier drive assembly 178 is shut off and the carrier is locked into place by the resiliently mounted gears 184 and 182 and the gauge member 250 located at its forwardmost or in position so that assembly work may be performed on the stationary carrier which is now disengaged from conveyor 28. Following the completion of work operations on the product, the operator presses button actuators 244 and 246 to close the S3 switch.

Upon closure, the S3 switch provides an input signal to terminal E of circuit 302 which provides an output signal at terminal F that is fed: along line 322 to the start input terminal of motor timer circuit 308; over line 324 connected to line 322 through OR gate 314 to the out/down terminal circuit 304; and over line 326 connected to line 322, to the input terminal A of a delay circuit 328.

Assume for the moment that while one carrier 30 is locked at the raised work position, the next carrier 30 being advanced into work station 20 by conveyor 28 has not yet reached a position to close the S1 switch. In this instance, the signal provided from output terminal F actuates the position control circuit 304 to retract the gauge member 250 and begin pivoting the stop 248 to its down position. Simultaneously with the retraction of gauge member 250, the motor timer circuit 308, actuated by the signal from terminal F over line 322, provides an output signal from its on terminal which is fed through OR gate 316 to the on terminal of motor control circuit 306 thereby energizing motor 192. In approximately 1.5 seconds after motor 192 is energized, motor timer circuit 308 automatically provides an output signal from its off terminal which is fed through OR gate 320 to the off terminal of motor control circuit 306 thereby deenergizing motor 192 which during its 1.5 second running period has affected advancement of the carrier 30 down the ramp structure and back onto the conveyor 28 for transport to the next work station 22.

As noted earlier, circuit 304 drives the stop member 248 down at a relatively slow rate so that it is not in its blocking position until the carrier 30 has been advanced by the drive system 178 to a point where pin 96 is well past the terminal end 300 of stop member 248. As mentioned earlier, the second pin 98 is relatively short and will pass under the terminal end of member 248 when it is in its down position. Delay circuit 328 is activated by a signal provided from terminal F and after a suitable delay that allows a carrier 30 to move past the gauge member 250 provides an output signal from its terminal B which is fed through a normally conductive solid state gate turn off device 330 and through OR gate 318 to the in/up terminal of circuit 304 causing gauge 250 to return to its in position and the stop member 248 to pivot to its raised position whereupon the control system automatically shuts down.

If, however, while the carrier 30 is locked at the raised position, a second carrier is advanced into the work station by conveyor 28 so that it closes the S1 switch before the S3 switch is closed, the last movement of the gauge and stop will be eliminated so that the next carrier is advanced into the raised work position as the carrier 30 positioned thereat is being advanced down the ramp structure to conveyor 28. This is accomplished by feeding the signal from terminal B over line 332 to the gate of device 330 thereby switching device 330 to its non-conductive state. Thus when the delayed signal from terminal B of delay circuit 328 is provided, it is blocked from reaching the OR gate 318 and the input terminal in/up of circuit 304.

It will be noted that if the work station is configured for mechanized work operation, then the S3 switch will tripped by the automatic assembly mechanism upon completion of its last motion.

As noted earlier with reference to FIG. 2, each of the modular units 10 includes a receiving roller assembly 46 at the entry end of the table and another roller assembly 44 at the exit end which cooperate when the modular units 10 are placed in end-to-end relation to provide a low friction path bridging the two units to facilitate carrier movement from the conveyor on one table to the conveyor on the next succeeding table. Additionally, if the two units are to be used in conjunction with the accumulator 12, the modular units 10 will also include an exit roller assembly 54 in a receiving roller assembly 64.

As best shown in FIG. 4, each of the above-described roller assemblies is identical in construction and includes a generally U-shaped support bracket 334 having a pair of laterally-extending shafts 336 and 338 extending between oppositely-spaced side walls of bracket 334. Shaft 336 carries a single centrally disposed roller 340 thereon. Shaft 338 carries a pair of oppositely-spaced rollers 342 and 344 thereon. The roller assemblies are mounted in recessed notches milled into table top 16 so that the top surfaces of the rollers are substantially in the same plane as the upper surface 138 of conveyor 28. As best shown in FIG. 2, it will be noted that the roller 340 on assembly 46 of unit 10b is aligned with the space between the rollers 342 and 344 on assembly 44 of unit 10a so that the carrier 30 travels across a geometrically well balanced roller path. The basic standard modular unit 10 will include roller assemblies 44 and 46 as a standard items. Appropriately angled cutout sections 346 and 348 are provided in table top 16 on the far side thereof for receiving accessory roller assemblies 56 and 62 of the same type of construction described above if the modular unit is going to be used with an accumulator unit 12.

As noted earlier, a carrier 30 passes onto the table of a modular unit 10 over roller assembly 46 and is guided onto the conveyor 28 by a longitudinally extending vertically upstanding guide bar or strip 48 which extends from roller assembly 46 to the entrance opening of work station 20 between the ramp members 160 and 164. In a preferred embodiment, guide bar 48 is attached to or is integrally formed by one longitudinal edge of a shallow parts holding tray 350 mounted on table top 16 so that it extends from the end of the table adjacent roller assembly 46 to the cover plate 156 of work station 20 and is flush along its forward edge with forward edge 158 of table top 16. Between work stations 20 and 22 the carrier is guided by a guide bar 352 integrally formed with or supported by a second parts tray 354 extending between the cover plates 156 of work stations 20 and 22. The opposite side of carrier 30 is guided by a longitudinally extending guide bar 356 mounted on table top 24 so that its bottom edge is above and clears the lateral margin portions of the chain flights 130. From the exit side of work station 22 the carrier is guided by the previously-noted pivotally mounted guide bar 42 which bridges or passes over conveyor 28 and the oppositely spaced guide bar 40 which in a preferred embodiment is integrally formed with or is supported by a third shallow parts tray 358.

The previously-noted deflecting guide bars 52 and 66 for deflecting carriers 30 with respect to the conveyor 28 for entry onto and receipt from the accumulator 12 are only used when the modular unit 10 is intended to be used with the accumulator 82. Therefore these guide bars 54 and 64 would be provided as an accesory to modular unit 10 but the table top 16 would have appropriately placed mounting holes, as suggested at 360 in FIG. 4, for receiving mounting posts on the end of these guide bars when their use is appropriate.

Other standard components of the modular unit 10 include a utility terminal board 362 secured to the underside of table top 16 and also to the table leg and stringer structure for connecting utility lines (air, electricity, water, gases, etc.) to corresponding utility lines mounted on the table (not all of which are shown) for operating the conveyor 28 and various components of the work stations. Unit 10 also includes a control box 364 for housing certain motor control circuits for varying the speed of conveyor drive motor 32 and the logic circuits shown in FIG. 11.

The accumulator unit 12 shown in FIG. 2 serves as a buffer between work station 22 of unit 10a and work station 20 of unit 10b for accumulating carriers 30.

For an example of the function of accumulator 12, assume work station 22 of unit 10a and work stations 20 and 22 of unit 10b are set up for manual assembly operations. If the operators at unit 10b are scheduled to take a short work break, the operator at station 22 of unit 10a pivots guide bar 42 90° to its rear position, shown in dotted lines, so that the carriers 30 leaving that work station are advanced by the conveyor 28 to a point where guide bar 52 deflects the carriers off conveyor 28, across roller assembly 54 and onto the first conveyor 52 of accumulator 12 through entrance gate 56. During the work break, the carriers 30 are advanced along the accumulator conveyors. By the time the operators return to unit 10b, the first carrier 30 on the accumulator 12 reaches the exit gate 62 of the last conveyor 60 where it is fed onto the conveyor 28 of unit 10b for transport to the entrance side of work station 20 thereon. The operator at station 22 on unit 10a now may go on break without interrupting the flow of work to unit 10b. Although not shown in the drawing, the flow of carriers 30 to unit 10a is temporarily suspended during this time by providing another accumulator unit 12 at a preceding interface along the production line between adjacent modular units 10.

In the preferred illustrated embodiment, accumulator 12 is formed in part by and is supported on the same type of commercially available work table employed in unit 10 and has six longitudinally extending conveyor belts disposed in adjacent parallel relation on the wood butcher block table top 366.

The opposite ends of table top 366 have elongated notches cut therein extending laterally to within about two inches of the lateral edges of the table top thereby defining at each end a pair of longitudinally extending end projections 368 for rotatably mounting the ends of transverse roller support shafts 370 and 372 extending across the notches and supporting a plurality of conveyor rollers and a drive pulley thereon (none of which are shown).

For visual and descriptive clarity, the accumulator conveyors will be designated C1 (first conveyor 58), C2, C3, C4, C5 and C6 (last conveyor 60).

Each accumulator conveyor comprises an elongated commercially available endless rubber or rubberized fabric belt, approximately 3.5" wide, which passes along and over the upper surface of table top 366, around a corresponding pair of rollers on shafts 370 and 372, and along the underside of the table top.

The rollers on shaft 372 associated with conveyors C1, C3 and C5, are keyed to and rotate with shaft 372, but the rollers associated with conveyors C2, C4 and C6 are not keyed to shaft 372 and are free to rotate thereabout independent of the rotation of the shaft. Conversely, at the opposite end of the table, the rollers associated with the even-numbered conveyors are keyed to shaft 370 and the rollers associated with the odd-numbered conveyors are mounted in a free-wheeling manner thereon.

The aforementioned drive pulley on each of the shafts 370 and 372 are keyed thereto and are connected by drive belts to a motor (none of which are shown) mounted on the underside of table top 366 for simultaneously rotatably driving the shafts 370 and 372 in opposite directions.

To an observer on the left side of accumulator unit 12, shaft 372 is driven in a counterclockwise direction so that the keyed rollers thereon drive the odd-numbered conveyor belts in a counterclockwise direction whereby their upper surfaces advance away from the production line and pass around the free-wheeling rollers on shaft 370. At the same time, shaft 370 is driven in a clockwise direction and the keyed rollers thereon drive the even-numbered conveyors in the opposite direction so that their upper surfaces advance toward the modular units 10a and 10b.

The six conveyors on table top 366 are separated by a plurality of upstanding longitudinally extending guide bars including two relatively long outer guide bars 374 and 376 disposed along the long edges of the table top adjacent conveyors C1 and C6 respectively, and five somewhat shorter intermediate guide bars 378, 380, 382, 384 and 386, each having rounded terminal ends.

Means for deflecting a carrier 30 from one accumulator conveyor to the next adjacent conveyor while at the same time affecting rotation of the carrier through approximately 180° include five identically constructed turnaround guide members designated 388a through 388e.

Guide member 388a is formed of a single strip of metal that is bent to include an angled straight section 390, having its free end secured to the far end of guide bar 374, followed by a rounded section 392 having its free end attached to the far end of guide bar 380. Guide member 388a is located above and bridges the upper surfaces of the far ends of conveyors C1 and C2. Although not shown in the drawing, the mid portion of guide member 388a is secured to an upstanding support post mounted in the table top between conveyors C1 and C2.

When a carrier 30 being advanced along conveyor 1 reaches the far ends of guide bars 374 and 378, its forwardmost left-hand corner engages the straight section 390 of guide member 388a, which is angled across conveyor C1 at an angle of approximately 45°, and is deflected thereby so that its forward end is located on conveyor C2 where its forward motion of the carrier is stopped by the rounded section 392 of guide member 388a. At this point, the geometrical center of the carrier base section 68 is beyond (to the right of) the rounded far end of guide bar 378. With this rounded end acting as a fulcrum along the right-hand side of the carrier base section behind its midpoint, the motion imparted to the forward end of the carrier by conveyor C2, moving in the opposite direction from conveyor C1, applies a turning moment to the carrier along with the oppositely directed turning moment applied thereto by conveyor C1 acting on the trailing end of the carrier base section to effect its rotation through 180° for transport along conveyor C-2. The remaining turnaround guide members 388b through 388e are coupled to the appropriate longitudinal guide bars, as shown in FIG. 2, to establish the serpentine path of travel back and forth along the length of the accumulator 12.

If for some reason a carrier becomes stalled at one of the turnaround guide members 388, the next succeeding carrier on the conveyor will engage the stalled carrier and propel it around the corner. Again, it should be noted that the initial straight section 390 of each turnaround guide member 388 allows the center of the carrier base section to move past the end of the intermediate guide bar so that the force applied to a stalled carrier by the next carrier on the conveyor will be behind the geometrical center so that the rounded end of the appropriate guide bar acts as a fulcrum to effect the turnaround motion. The cost of the accumulator unit 12 is reduced significantly by employing the previously-described passive turnaround guide members 388 rather than having to provide some mechanized device for effecting transfer to the next adjacent conveyor along with the accompanying and required carrier rotation.

The arrangement of the two in-line modular units 10a and 10b with the transversely-disposed accumulator unit 12, shown in FIG. 2, may be thought of as representing a portion of a much longer production line utilizing additional modular units 10, and, if required, more accumulator units 12. For the purpose of this disclosure, the accumulator unit 12 is utilized to show the versatility of the modular unit 10 and those skilled in the art will recognize that a suitable production line may be formed without any accumulator units merely by arranging a plurality of the modular units 10 in series.

In the operation of such a production line, carriers 30 would be fed onto unit 10a from a preceding unit 10 whereby the carrier is propelled over the receiving roller assembly 46 and onto the conveyor 28 for transport thereby to the entrance opening of work station 20 along guide bar 48. Assuming that a carrier 30 is not located at the raised work position at this time, the gauge member 250 will be at its in position and the stop member 248 will be in its raised position. The conveyor 28 advances the carrier 30 far enough into the work station 20 so that the flat entry sections 168 of the ramps 160 and 164 enter the rail receiving channels 114 and 116 in the side walls of carrier base section 68. At this point, the leading edge of the taller forward pin 96 on the carrier engages the outside edge of finger 254 on gauge member 250 thereby stopping further forward movement of the carrier so that the carrier position is fixed and the moving conveyor 28 slides under the carrier base section 68. When the carrier 30 is in this position, the gear rack 112 is in alignment to be engaged by the teeth of gear 182. It will be remembered that the gear 182 is spring biased so that it will extend further over the ramp 160 then shown in its retracted position of FIG. 4. Also, the presence of carrier 30 will effect a closure of switch S1.

If a carrier 30 is locked at the raised work position, the next carrier on the conveyor advanced into the entrance side of the work station has its end surface 118 in abutment with the end surface of the locked carrier thereby automatically positioning the rear carrier in proper alignment to be engaged by the carrier drive gear 182. In other words, the length of the carrier base section is critical and is used so that sequentially abutting carriers become self-aligned with respect to the components of the work station carrier drive system.

As explained earlier, when S1 is actuated, gauge member 250 moves rearwardly to its out position; stop member 248 pivots to its down position; and motor 192 is energized to drive the gears 182 and 184. As gear 182 rotates and advances the carrier 30 forwardly, it pivots outwardly toward its retracted position. Soon the leading edge of gear rack 112 becomes engaged with the teeth of the forwardly biased gear 184 which applies additional drive to the carrier and likewise begins to move to its retracted position. The gears 182 and 184 advance the carrier 30 thereby driving it up the ramp sections 170 to the raised work position section 172 so that the carrier base section 68 is spaced above and disengaged from the moving conveyor 28. The raised work position is reached when the leading edge of pin 96 becomes engaged with the terminal end portion 300 of stop member 248 at which point the carrier actuates the S2 switch. This causes the drive motor 192 to be deenergized, the gauge member 250 to be driven forwardly to its in position whereby the V-notch 276 on finger 252 engages pin 96 and the flat surface 278 on finger 254 engages pin 98 and the stop member 248 to be pivoted to its up position. The notch 276 on finger 252 accurately establishes the longitudinal position of the carrier 30 within work station 20. The lateral position is established by both the notch 276 and the flat surface 278 on finger 254. The combination of the fixedly positioned fingers 252 and 254 acting on the pins 96 and 98 on the far side of the carrier in combination with the laterally directed compression forces applied to the gear rack 112 by the spring biased gears 182 and 184 firmly clamp or lock the carrier at the raised work position for facilitating the performance of manual or mechanized work operations on the products supported on the carrier nest 70.

Assume for the moment that work station 20 on unit 10a is a manual station. At this point an operator seated or standing at the off-table position in front of work station 20 would add a piece part to the assembly on nest 70. For convenience, such a piece part may be stored in trays 350 or 354. Upon completion of the assembly operation, the operator would push the buttons 244 and 246 to close the S3 switch. In response to the closure of the S3 switch, gauge member 250 moves to its out position and motor 192 is energized so that gears 182 and 184 drive the carrier 30 forwardly and down the ramp sections 174 onto the flat exit sections 176 where the bottom of the carrier becomes reengaged with conveyor 28 for transport to work station 22. After the taller pin 96 passes by stop 248, it returns to its down position to intercept the next carrier 30 assuming it has entered station 20 so that it closes the S1 switch. If the S1 switch is not closed at this point, the gauge member 250 and the stop member 248 are automatically reset to their initial positions.

The conveyor 28 carries the carrier 30 from station 20 to 22 where the same procedure is initiated. Following assembly operations at station 22, carrier 30 is reengaged with the conveyor 28 and carried forwardly until it is deflected off of the conveyor by guide bar 42 and is propelled over the roller assembly 44 of unit 10a and the aligned cooperating roller assembly 46 of table 10b whereupon it is guided by guide bar 48 onto the conveyor 28 of unit 10b for transport to the entrance side of its work station 20.

If after leaving work station 22 on unit 10a it is desired to redirect the carrier 30 to accumulator unit 12, guide bar 42 is pivoted to its dotted line position so that conveyor 28 advances it around the corner and along the short side of the conveyor which once again turns it until it is deflected off the conveyor by guide bar 52 so that it passes over roller assembly 54 into the entrance way 56 of the first accumulator conveyor 58 whereupon the carrier will advance along the accumulator path and thereafter be advanced onto the conveyor 28 of unit 10b as previously described.

The use of modular unit 10 allows the production line to be modified in any number of different ways. For example, a manual work station may be changed to a mechanized work station simply by mounting an automatic assembly device on the mounting plate 162. If for some reason the automatic assembly device becomes disenabled, then an operator may be stationed at the off-table position to continue assembly operation on a manual basis while the automatic assembly device is being repaired. If additional work stations are needed on the assembly line, they may be provided by simply adding the required number of modular units 10.

The modular production line concept is particularly useful in the beginning stages of assembling a new product because the line can be set up for manual assembly operations and then be slowly changed over to mechanized assembly once the component parts are fully engineered and are manufactured to specified tolerances. Also, such a line provides the flexibility of allowing a good mix of manual and mechanized work stations. Those skilled in the art will recognize certain complex assembly operations may be accomplished more quickly and economically when done on a manual basis than with an expensive and necessarily slow mechanized assembly machine.

While the units 10 have been shown to include two side-by-side work stations, those skilled in the art will recognize that unit 10 may only include a single work station without departing from the scope, spirit and intent of the present invention.

The unit 10 may also be used alone with suitable turnaround guide bars at the end of the conveyor to provide a closed loop system whereby a plurality of carriers are sequentially presented at one or more work stations for manual assembly operations. In this configuration, the operator will do the same assembly operation on all of the products on the conveyor before going on to the next assembly operation. That is, the conveyor will carry the same carrier by the work station a number of times whereby different parts are added during each pass through the station. It has long been recognized that operator efficiency increases dramatically when he or she is able to do the same task on a repetitive basis and develop an efficient rhythm.

Since certain changes may be made in the above-described system and apparatus without departing from the scope of the invention herein involved, it is intended that all matter contained in the above description or shown in the accompanying drawings shall be interpreted as illustrative and not in a limiting sense.

We claim:

1. An accumulator usable with a production line formed by a plurality of production units for receiving in sequence a plurality of product supporting carriers advanced thereonto from one such production unit, for advancing the carriers along a path of a given length on said accumulator at a given rate, and for thereafter effecting advancement of the carriers in sequence onto the next production unit in the line, the carriers being of the type including a generally rectangular standardized base section of given dimensions, said accumulator comprising:

a table having an upwardly facing top horizontal surface;

a plurality of endless conveyors mounted on said table in side-by-side parallel relation for sequentially advancing a plurality of the carriers therealong in succession from a first said conveyor to a last said conveyor, said conveyors being designated in successive numerical order starting with said first said conveyor and being configured so that each of said odd-numbered conveyors are continuously movable in a first direction away from the production line and each of the even-numbered conveyors are continuously movable in a second direction opposite said first direction toward the production line, each of said conveyors being movable along its own corresponding closed loop path having a major portion thereof adjacent said table top surface and along which said conveyor advances the carriers, said major portions of said closed loop paths cumulatively defining a serpentine carrier path of travel of said given length;

means for simultaneously driving said odd-numbered conveyors in said first direction and said even-numbered conveyors in said second direction at a uniform given rate; and means for guiding carriers along said path of travel on said accumulator, said guide means including means for defining an entrance gate for guiding the carriers received from the one production unit onto said first conveyor, means for defining an exit gate for guiding the carriers from said last conveyor onto the next production unit, and passive means located adjacent ends of said major portions of said conveyors between said entrance and exit gates and responsive to motion imparted to the carriers by next adjacent conveyors for guiding the carriers so that they are displaced from one conveyor onto the next successive adjacent conveyor and are turned through approximately 180° in response to said displacement, said passive guide means including a plurality of turnaround guide bars, each located adjacent ends of two next adjacent conveyors, and a plurality of fulcrum members, each spaced from a corresponding one of said turnaround guide bars and located between its next adjacent conveyors, each of said turnaround guide bars including a substantially straight section angled across one conveyor moving toward said turnaround guide bar and engageable by one longitudinally extending side of the rectangular carrier base section for deflecting the leading end of the carrier off the one conveyor and onto the next conveyor such that the geometrical center of the base section is beyond said corresponding fulcrum member which is engageable by the opposite longitudinally extending side of the base section and acts as a fulcrum about which the base section pivots for facilitating the turning of the carrier, each said turnaround guide bar also including a rounded section following said straight section and facing the next adjacent conveyor moving away from said turnaround guide bar for guiding the carrier around through said turn.

* * * * *